United States Patent [19]

Buck

[11] Patent Number: 5,118,017
[45] Date of Patent: Jun. 2, 1992

[54] STORAGE CONTAINER

[76] Inventor: Norman G. Buck, P.O. Box 768, Albany 6330, Australia

[21] Appl. No.: 602,206

[22] Filed: Oct. 23, 1990

[30] Foreign Application Priority Data

Nov. 6, 1989 [AU] Australia .................. PJ7244

[51] Int. Cl.⁵ .............................. B62D 43/00
[52] U.S. Cl. ..................... 224/42.130; 224/42.140
[58] Field of Search ............ 224/42.13, 42.2, 42.24, 224/42.06, 319, 328, 42.14, 42.15, 42.16, 42.19, 42.26

[56] References Cited

U.S. PATENT DOCUMENTS

| 1,616,155 | 2/1927 | Uebelmesser | 224/42.13 |
|---|---|---|---|
| 2,852,174 | 9/1958 | Mauer | 224/42.14 |
| 3,715,066 | 2/1973 | Owen | 224/42.24 |
| 3,880,335 | 4/1975 | Winkler | 224/42.13 |
| 4,498,614 | 2/1985 | Guarr | 224/42.24 |
| 4,830,241 | 5/1989 | Ulmer et al. | 224/42.2 |
| 4,915,274 | 4/1990 | Oliver | 224/42.24 |

Primary Examiner—Henry J. Recla
Assistant Examiner—David J. Walczak
Attorney, Agent, or Firm—Ralph F. Crandell; Gary M. Polumbus

[57] ABSTRACT

A storage container mountable on the exterior spare wheel of a vehicle. The storage container has a storage space defined by a base and a removably mounted cover. The container is removably mounted against the outer side of the spare wheel in contact with the tire. The cover includes a threaded sleeve which extends through the base for engagement by a nut. A threaded shaft is mounted on the spare wheel and extends through the sleeve for engagement by a fastener to secure the container to the wheel. Access to the storage space is gained by first removing the container from its position against the spare wheel and then separating the base and cover.

13 Claims, 2 Drawing Sheets

STORAGE CONTAINER

BACKGROUND OF THE INVENTION

1. Field of the Invention

The present relates to a storage container for mounting onto a motor vehicle.

2. Description of the Prior Art

With certain types of motor vehicles, particularly four wheel drive vehicles, there is limited storage space which presents some difficulty in storing a spare wheel and other equipment required in a break down situation without occupying too much space within the vehicle. Because of the limited storage space within the vehicle and also for ease of access, it is common practice to mount the spare wheel exteriorly of the vehicle, typically on a frame at the rear of the vehicle. The frame incorporates threaded studs at spacings corresponding to the mounting holes in the wheel and the wheel is retained in place by nuts in threaded engagement with the studs. While this arrangement does allow easy access and ensures that useful storage space within the vehicle is not occupied by the spare wheel, it does not address the problem of storage of goods such as spare parts, tools, a tow rope and other equipment required in break down situations.

OBJECTS OF THE INVENTION

The principal object of the present invention is to provide an improved storage container which can be mounted exteriorly of a vehicle.

Another object of the present invention is to provide an improved storage container which is attractive in appearance, rugged and tightly sealable and yet easily mounted on or removed from the vehicle.

A further object of the present invention is to provide an improved storage container of the foregoing character which is mountable in an easily accessible position on the vehicle and takes up no otherwise valuable space.

Still another object of the present invention is to provide an improved storage container of the foregoing character which when mounted in place on the vehicle's spare tire protects the studs and nuts of the spare tire mounting from corrosion, mud and the like.

Other objects and advantages of the present invention will be apparent as the following description proceeds.

SUMMARY OF THE INVENTION

According to the invention there is provided a storage container for mounting exteriorly of a vehicle, said container comprising a base and a cover mounted on said base, said base and cover defining a storage space, and mounting means for mounting said base adjacent one side of a spare wheel carried exteriorly of the vehicle.

The cover is readily removable from the base to provide access to the storage space of the container. The mounting structure supports the base in pressing engagement or juxtaposition with the tire of the spare wheel. The fastener securing the cover to the base comprises an externally threaded sleeve mounted internally in the cover and extends through an aperture or opening in the base to which it is secured by a threaded nut, such as a wing nut. The structure mounting the container on the spare wheel comprises an externally threaded mounting shaft positioned axially centrally of the wheel for receiving and supporting the base and cover. The mounting shaft in use extends coaxially through the sleeve of the fastening structure for the cover and base. The sleeve defines a mounting hole for receiving the mounting shaft, and a retaining means such as a key operated locking nut, is utilized for releasably engaging the shaft to clamp the base and cover together and hold the container tightly against the tire.

BRIEF DESCRIPTION OF THE DRAWINGS

The invention will be better understood by reference to the following description of one specific embodiment thereof as shown in the accompanying drawings in which.

DESCRIPTION OF PREFERRED EMBODIMENT

Figure 1:
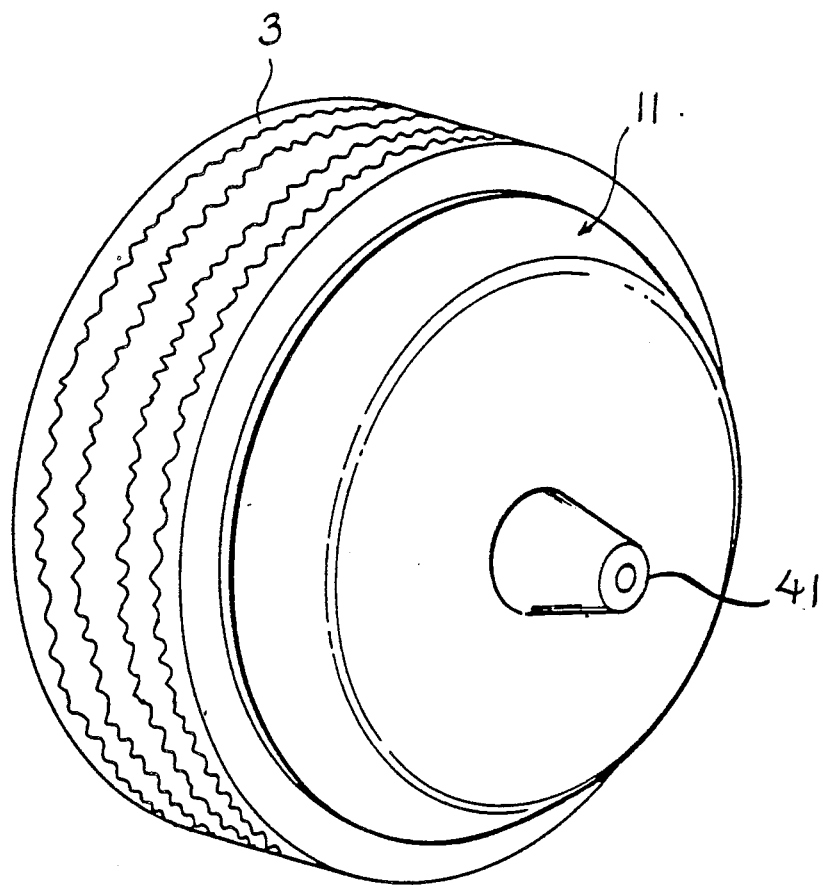
FIG. 1 is a perspective view of a storage container according to the embodiment mounted adjacent a spare wheel of a vehicle.

The embodiment shown in the drawings is directed to a storage container 11 for mounting adjacent a spare wheel 3 for a four wheel drive vehicle (not shown). The spare wheel comprises a tire 5 mounted on a rim 7 having circumferentially spaced mounting holes for receiving wheel mounting studs on the vehicle. The spare wheel is mounted onto a frame (not shown) which is itself mounted onto the rear of the vehicle. The frame includes a plurality of stud bolts 9 which extend rearwardly and are circumferentially spaced to correspond to the arrangement of the mounting holes in the rim of the wheel.

The storage container 11 comprises a base 13 which is circular and of a diameter generally corresponding to the diameter of the tire 5. The storage container further includes a cover 15 which is removably mountable onto the base 13 to provide a storage space 17. The cover 15 has an end wall 19 and a generally circular side wall 21 which is open at the end opposite the end wall 19 to provide access into the storage space 17 when the cover is removed from the base. The confronting faces of the base 13 and the end wall 19 are each provided with a layer of cushioning material 23 such as sponge to cushion and protect any equipment housed within the storage space 17.

Figure 2:
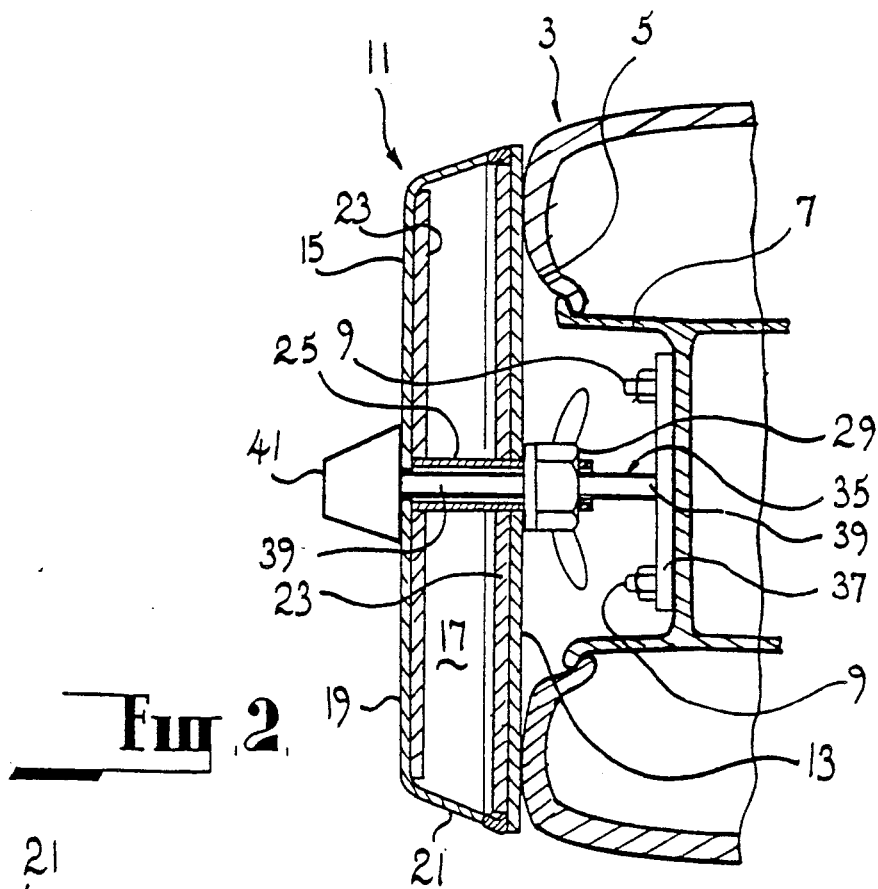
FIG. 2 is a sectional view of the storage container mounted adjacent the spare wheel.

An externally Threaded hollow shaft or sleeve 25 is mounted on the end wall 19 of the cover 15 and extends through the storage space and beyond the access opening in the cover. A central hole 27 is provided in the base 13 to receive the shaft 25, as best shown in FIG. 2 of the drawings. A wing nut 29 is threadingly engagable with the shaft 25 to fasten the base to the cover, a washer 31 being provided between the wing nut and the base. With this arrangement, access to the storage space 17 is gained by removing the wing nut 29 from the shaft 25 thereby allowing the base to be moved away from the cover 15.

Figure 3:
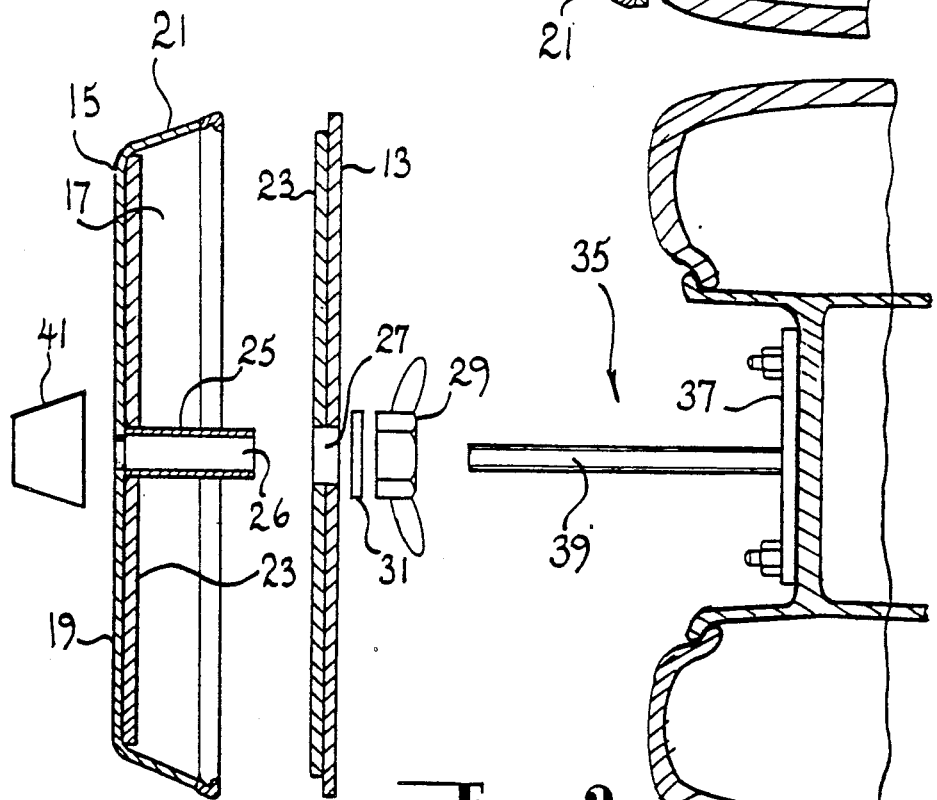
FIG. 3 an exploded view of the storage container.

Mounting means 35 are provided for mounting the assembly of the base and cover in position adjacent the spare wheel of the vehicle. In this embodiment the mounting means comprises a mounting plate 37 having a plurality of mounting holes (not shown) in a circumferential spaced arrangement corresponding to the arrangement of the stud bolts 9. In this way, the mounting plate 37 can be mounted onto the spare wheel mounting frame on the outside of the spare wheel by way of the stud bolts 9, as shown in FIGS. 2 and 3 of the drawings.

An externally Threaded mounting shaft 39 is connected to, and extends outwardly from the mounting plate. The mounting shaft is adapted to support the assembly of the base 13 and cover 15. In this regard, the assembly of the base and cover is positioned on the mounting means with the mounting shaft 39 received within the bore 26 of the hollow shaft 25, as shown in FIG. 2 of the drawings. A releasable locking nut 41 is provided for threaded engagement with the mounting shaft 39 to retain the assembled base and cover in position on the mounting shaft. The locking nut provides a security function and must be operated by a key before it can be released from threaded engagement with the shaft 39. With this arrangement, the locking nut 41 urges the assembled base and cover towards the wheel and the base bears against the tyre 5 of the wheel. The assembled base and cover can therefore be clamped between the tire and the locking nut 41 to securely retain it in position.

In another arrangement (which is not shown), the mounting shaft 39 can be mounted at its inner end directly onto the part of the frame which supports the wheel studs 97 rather than being mounted on the removable mounting plate 37 as described above.

From the foregoing, it is evident that the present invention provides a simple and useful storage compartment which can be mounted exteriorly of a vehicle for storage of equipment such as vehicle spare parts, tools and a tow rope, and which is accessible without having to unload any of the vehicle.

I claim:

1. A storage container for mounting adjacent a spare wheel mounted on a spare wheel bracket exteriorly of a vehicle, said container comprising a base and cover a defining a storage space, said cover being removably mounted on said base to provide access to said storage space, and means for mounting said container adjacent one side of said spare wheel carried exteriorly of the vehicle, said mounting means comprising a mounting shaft adapted to be mounted to the spare wheel bracket means defining a mounting hole extending through said base and said cover and receiving said mounting shaft and means for securing said container to said mounting shaft.

2. A storage container as defined in claim 1 wherein said mounting means is adapted to support said base in pressing engagement with the tire of the spare wheel.

3. A storage container as defined in claim 1 wherein said mounting shaft is mounted co-axially with said spare wheel.

4. A storage container as defined in claim 3 wherein said mounting means further comprises a mounting plate adapted to be removably mounted onto stud bolts provided for mounting of the spare wheel in a stored position, said mounting shaft being connected at one end thereof to the mounting plate.

5. A storage container as defined in claim 1 wherein means are provided for releasably engaging said mounting shaft to for mounting and retaining said base and said cover on said wheel.

6. A storage container as defined in claim 1 wherein means are provided for releasably fastening said cover to said base.

7. A storage container as defined in claim 6 wherein said releasable fastening means includes a hollow shaft, the cavity wherein said hollow shaft providing said mounting hole for receiving said mounting shaft.

8. A storage container as defined in claim 7 wherein said hollow shaft is mounted at one end on said cover and wherein said base has an opening through and beyond which said hollow shaft extends when said cover is mounted on said base, the portion of said hollow shaft extending beyond said base being engagable by said releasable fastening means.

9. A storage container according to claim 8 wherein said releasable fastening means comprises a nut adapted for threaded engagement with said portion of said hollow shaft.

10. A storage container for mounting exteriorly of a vehicle, said container comprising a base and a cover removably mounted on said base, said base defining a storage space therein and cover each having a mounting aperture therethrough in alignment with each other, a mounting plate adapted to be mounted on spare wheel stud bolts exteriorly of the vehicle, said mounting plate defining holes for attachably receiving said stud bolts, a mounting shaft supported at one end on said plate and extending co-axially with said spare wheel, said cover and base being removably mounted on said shaft by sliding said shaft through said apertures and means on the other end of said shaft for securing and retaining said container.

11. A storage container as defined in claim 10 wherein said base and said cover define a mounting aperture for receiving an inserted end of said mounting shaft, and further including means for releasably engaging said inserted end of said shaft exteriorly of said container for releasably securing said container in juxtaposition with said wheel.

12. A storage container as defined in claim 11 including means mounted centrally and axially of said container for reasonably fastening said cover to said base.

13. A storage container as defined in claim 12 wherein said fastening means comprises an externally threaded sleeve secured at one end to said cover and at its other end extending through an aperture defined in said base, said sleeve defining said aperture for receiving said mounting shaft, and means for threadably engaging said other end of said sleeve externally of said base for releasably securing said cover and said base together.

* * * * *